S. OPPENHEIMER.
Milk Pail.
No. 19,648.
Patented March 16, 1858.
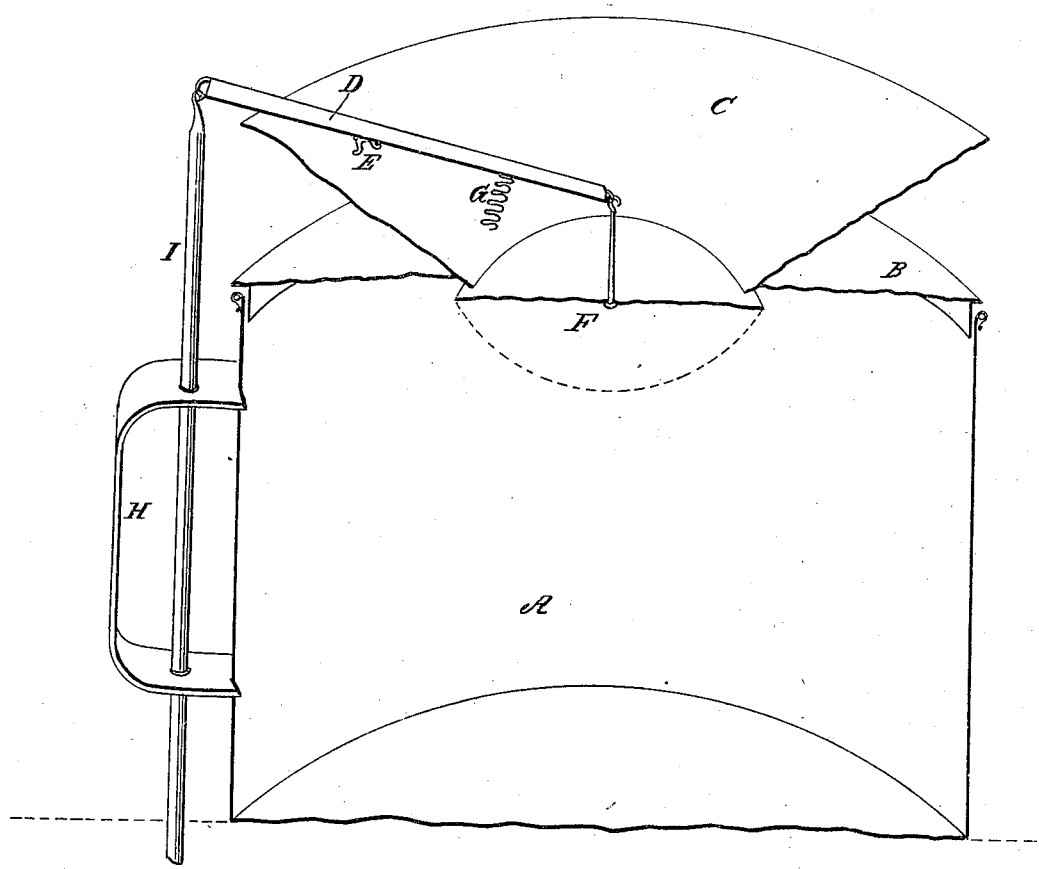

UNITED STATES PATENT OFFICE.

SOLOMON OPPENHEIMER, OF WASHINGTON, DISTRICT OF COLUMBIA.

MILKING-PAIL.

Specification of Letters Patent No. 19,648, dated March 16, 1858.

*To all whom it may concern:*

Be it known that I, SOLOMON OPPENHEIMER, of Washington, in the District of Columbia, have invented a new and Improved Mode of Constructing Vessels or Pails for Milking; and I do hereby declare that the following is a full and exact description thereof, reference being had to the accompanying drawings and to the letters of reference marked thereon.

The nature of my invention consists in constructing any of the commonly used pails, buckets or other similar vessels in such a manner as to prevent the milk from running out of the same, in case it should get overthrown by the cow, while the same is being milked.

To enable others skilled in the art to make and use my invention, I will proceed to describe the same.

Letter A represents a tin bucket with one half removed so as to show the improvement.

B is the lid to the same, which has a circular opening in its center and around which a hopper C is permanently fixed.

D is a swinging bar or lever which works freely up and down, on a looped pin E which latter is soldered to the inside of the hopper. The bar D has a loop on each of its ends and on the one which reaches within the hopper there is hung a circular plate F, by means of a small wire-rod with a hook. This circular plate is on the inside of the opening in the lid and is somewhat larger than the said opening and is held firmly on to it by means of a spring G acting on the bar D.

H is a handle on the bucket having holes perpendicularly through it, and through which passes a rod I. This rod is fastened to the outer end of the bar above and reaches down somewhat beyond the bottom of the bucket, so that, when the bucket is set on to the floor the rod I will be pushed upward and the inner end of the bar D thereby depressed causing the circular plate F, to be removed from the opening and by so doing permitting the milk to flow into the vessel. As soon however as the bucket is removed from its upright position the rod I is relieved from pressure, the spring G acting under the bar D causing the same to press on to the orifice of the lid the circular plate F which latter closes the opening and prevents thereby any milk to escape.

I am aware that plugs or valves are pressed against the orifices of vessels for holding liquids, and the same kept closed through the instrumentality of springs, and such has been described in the English *Patent Journal*, vol. VII, page 146, by Theo. de Mevillac on his oil-can, also a similar device has been patented to Geo. Trott, on his lubricating cup in 1856. I therefore disclaim any such devices; but

I claim—

The pendant rod and lever-bar and when combined, and for the purpose of keeping the orifice on the milking pail open when the same stands uninterrupted and in its proper position, anything else I hereby disclaim.

SOLOMON OPPENHEIMER.

Attest:
 WILLIAM COCHRANE,
 DANIEL REEDER.